United States Patent
Dreux et al.

(10) Patent No.: US 11,493,160 B2
(45) Date of Patent: Nov. 8, 2022

(54) INSTANTANEOUS CONNECTION DEVICE

(71) Applicant: AKWEL, Champfromier (FR)

(72) Inventors: Jérémy Dreux, Mallemort du Comtat (FR); Fabien Heraud, Chateaurenard (FR)

(73) Assignee: AKWEL, Champfromier (FR)

( * ) Notice: Subject to any disclaimer, the term of this patent is extended or adjusted under 35 U.S.C. 154(b) by 158 days.

(21) Appl. No.: 16/658,273

(22) Filed: Oct. 21, 2019

(65) Prior Publication Data

US 2020/0124218 A1    Apr. 23, 2020

(30) Foreign Application Priority Data

Oct. 19, 2018 (FR) ..................... 18/71222

(51) Int. Cl.
   *F16L 37/088*        (2006.01)
(52) U.S. Cl.
   CPC .................. *F16L 37/088* (2013.01)
(58) Field of Classification Search
   CPC ............... F16L 27/0849; F16L 27/0861; F16L 27/0808; F16L 37/088; F16L 37/0885; F16L 37/10; F16L 37/113; F16L 37/53; F16L 41/007; F16L 43/02
   USPC ............... 285/321, 319, 330, 184, 282, 276
   See application file for complete search history.

(56) References Cited

U.S. PATENT DOCUMENTS

2016/0047502 A1* 2/2016 Varghese .............. E21B 17/043
                                                            285/89

FOREIGN PATENT DOCUMENTS

| CN | 105020549 A | 11/2015 |
|---|---|---|
| CN | 107620846 A | 1/2018 |
| EP | 1 724 511 A2 | 11/2006 |
| EP | 1 972 846 A1 | 9/2008 |
| FR | 2914043 A1 | 9/2008 |
| FR | 2 978 230 A1 | 1/2013 |
| FR | 3 059 756 A1 | 6/2018 |

* cited by examiner

*Primary Examiner* — Aaron M Dunwoody
(74) *Attorney, Agent, or Firm* — Oliff PLC

(57) ABSTRACT

The quick-connect device for the assembly of first and second fluidic transport elements includes a female connector and a male lock-ring connector configured to cooperate with the female connector and to relatively immobilize axially and in rotation the first element with the female connector. The male connector and the female connector respectively include first and second complementary positioning members configured to define a plurality of predefined discrete positions of assembly of the two male and female connectors, distributed angularly around the main axis, such that in any one of these angular positions, the two connectors are immobilized in rotation relative to one another.

14 Claims, 10 Drawing Sheets

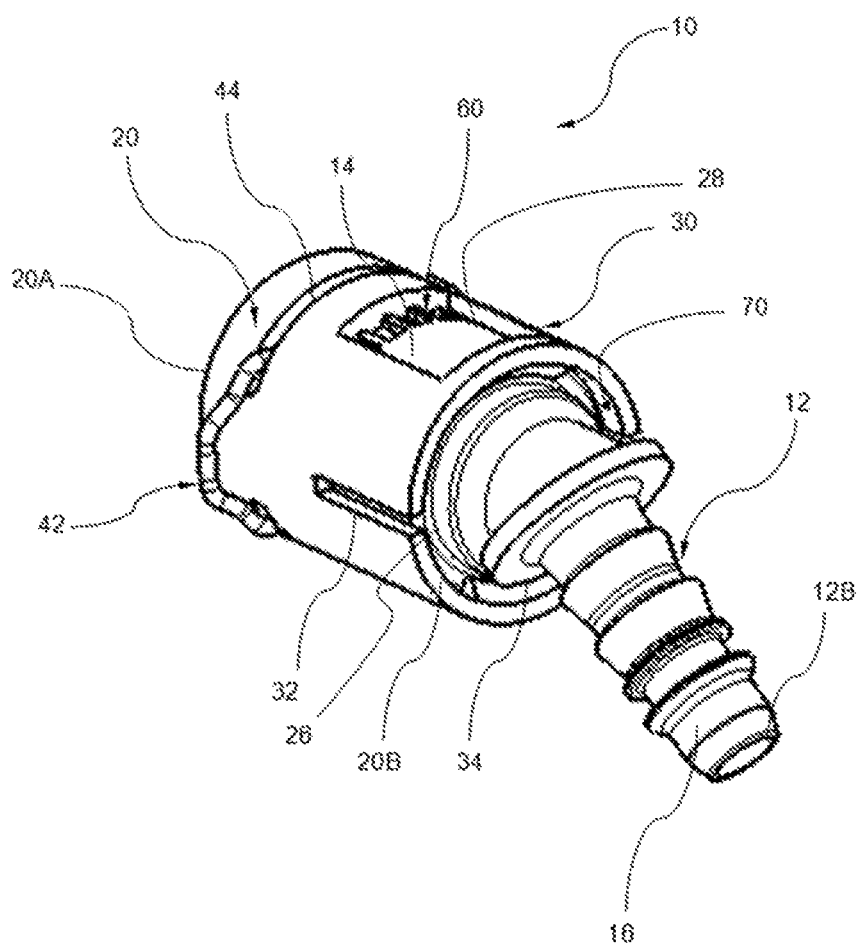
[Fig. 1]

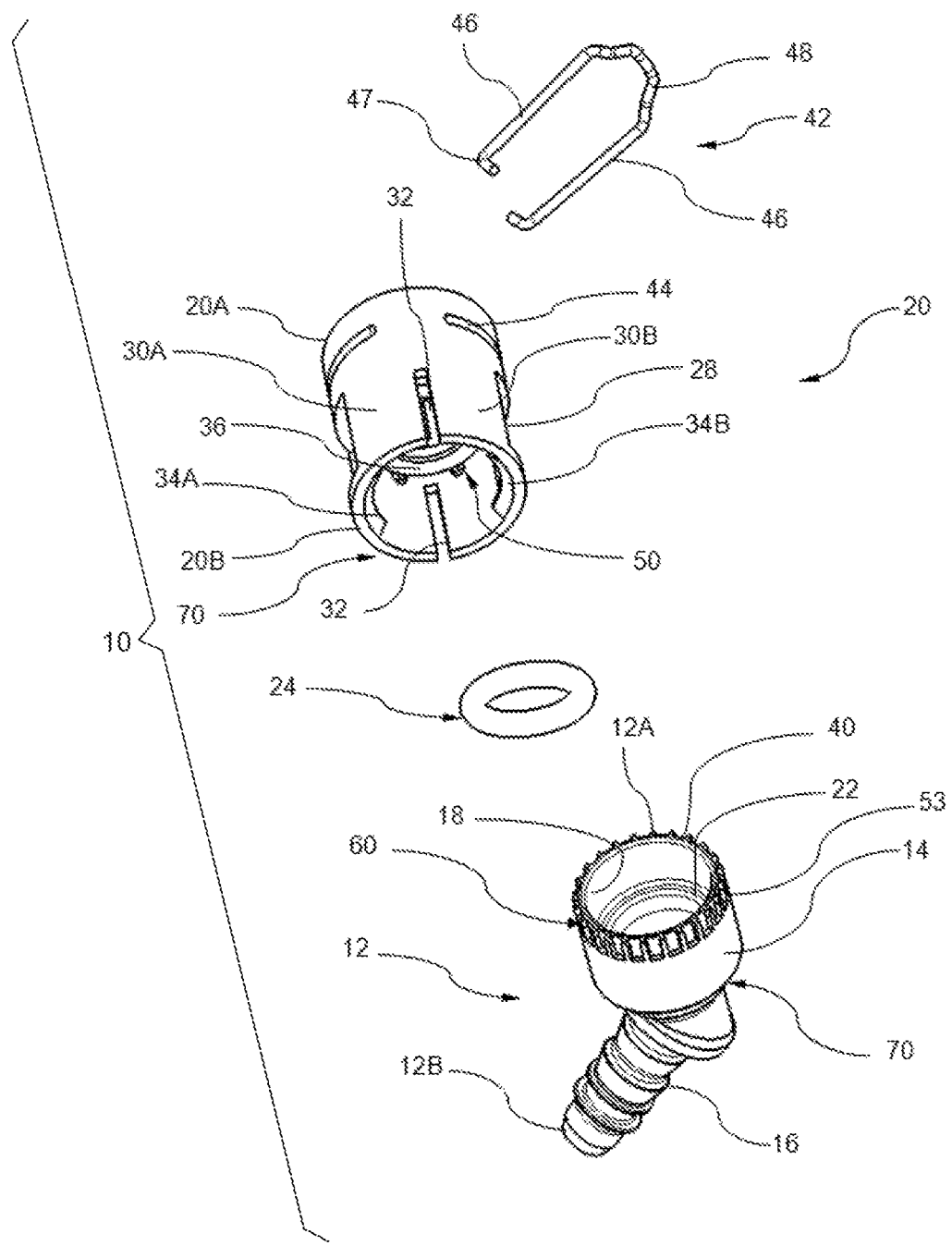
[Fig. 2]

[Fig. 3]
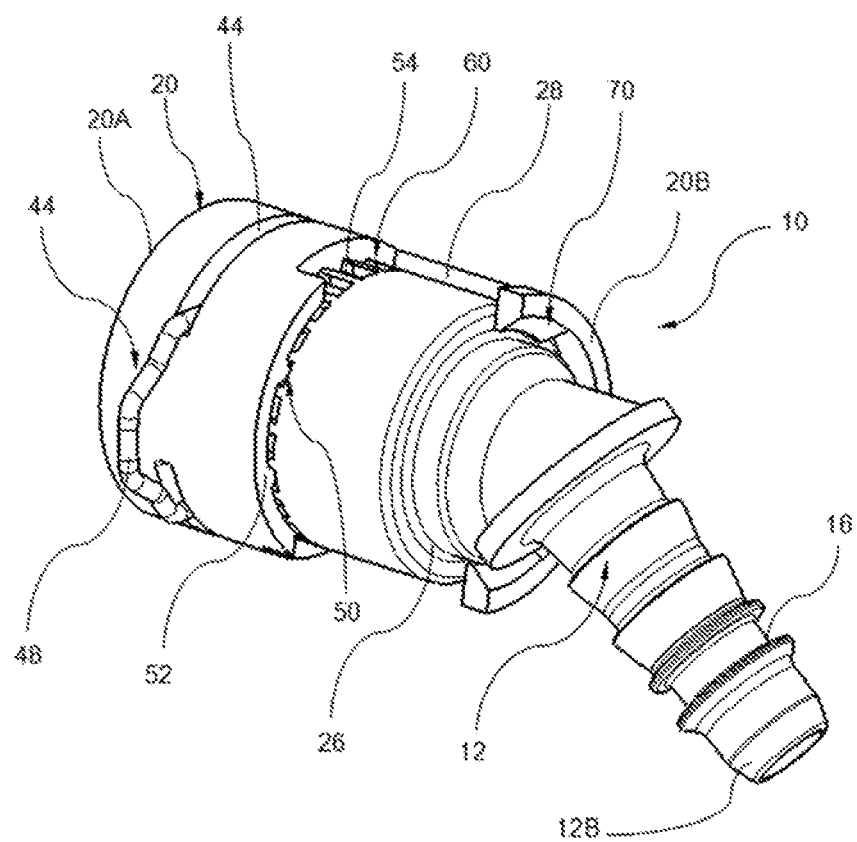

[Fig. 4]
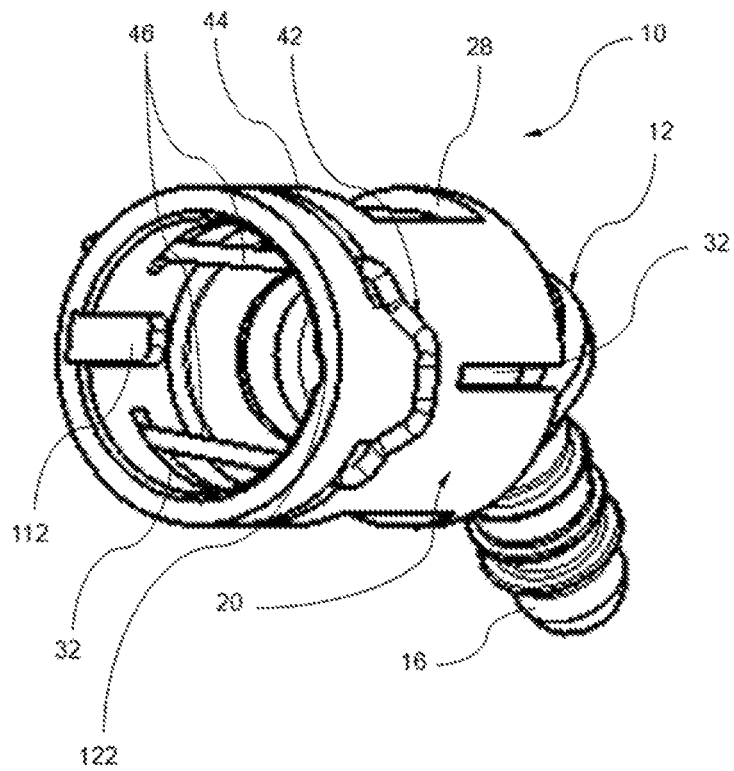

[Fig. 5]
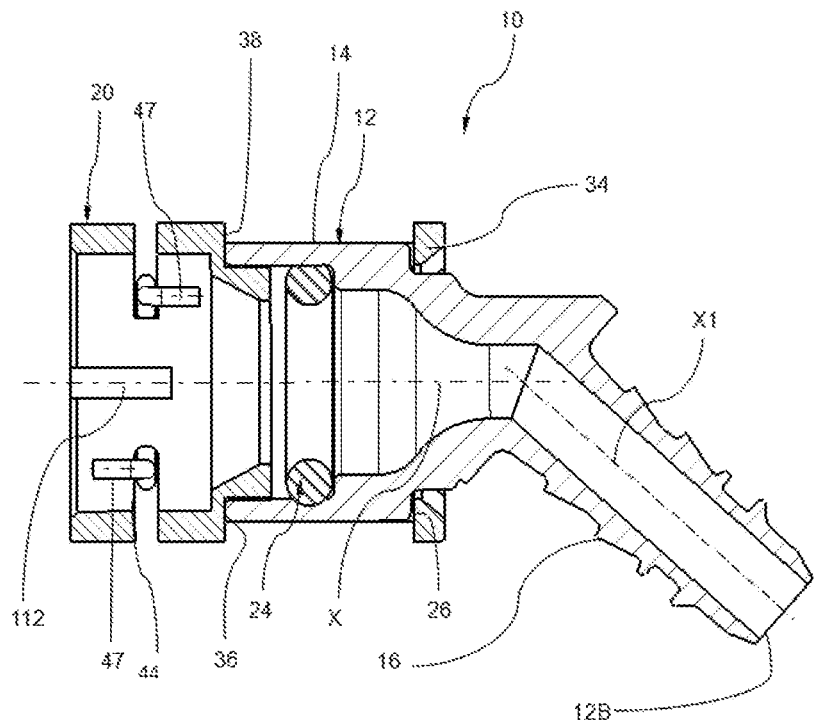
[Fig. 6]
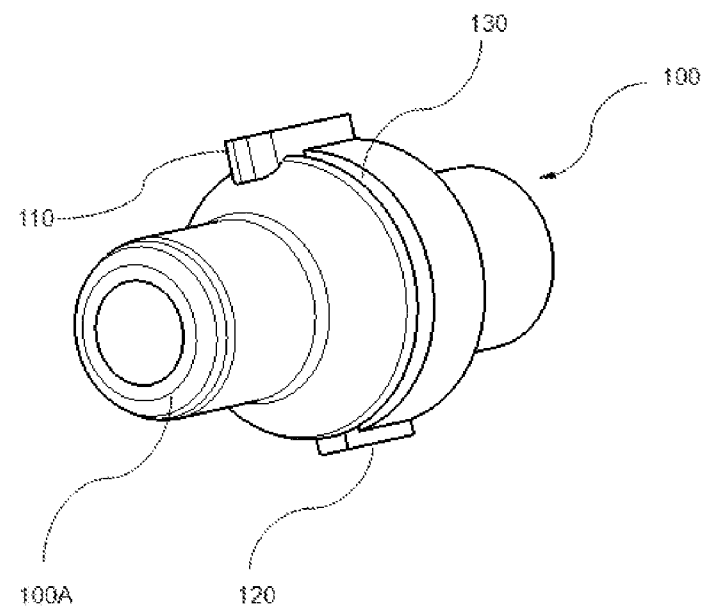

[Fig. 7]
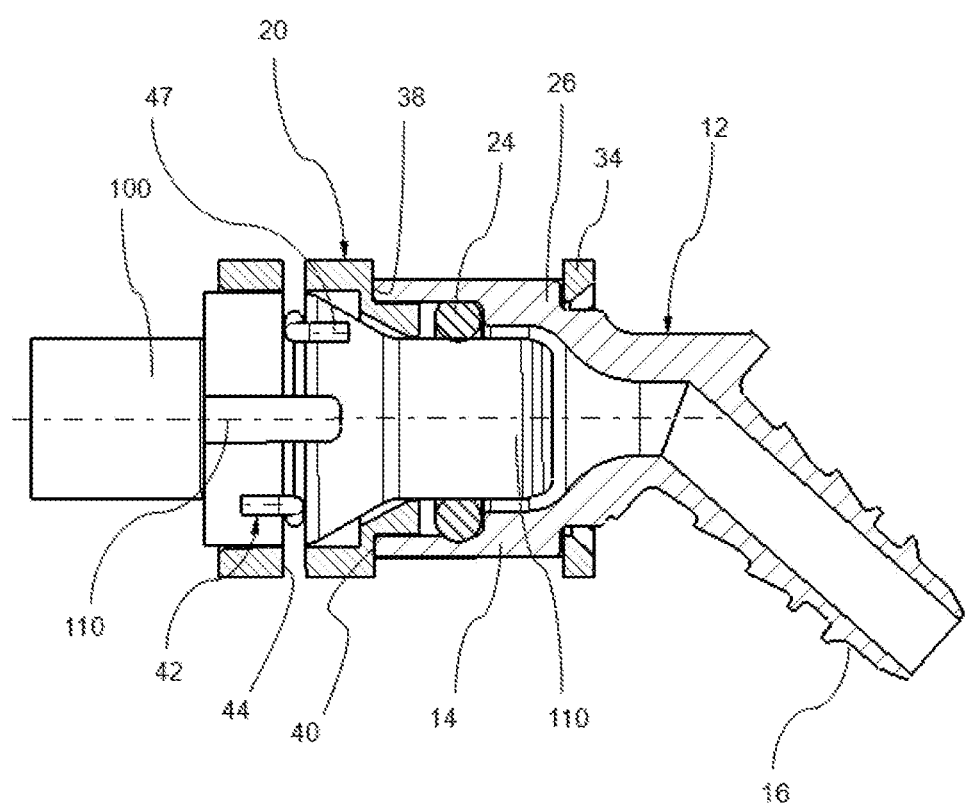

[Fig. 8]
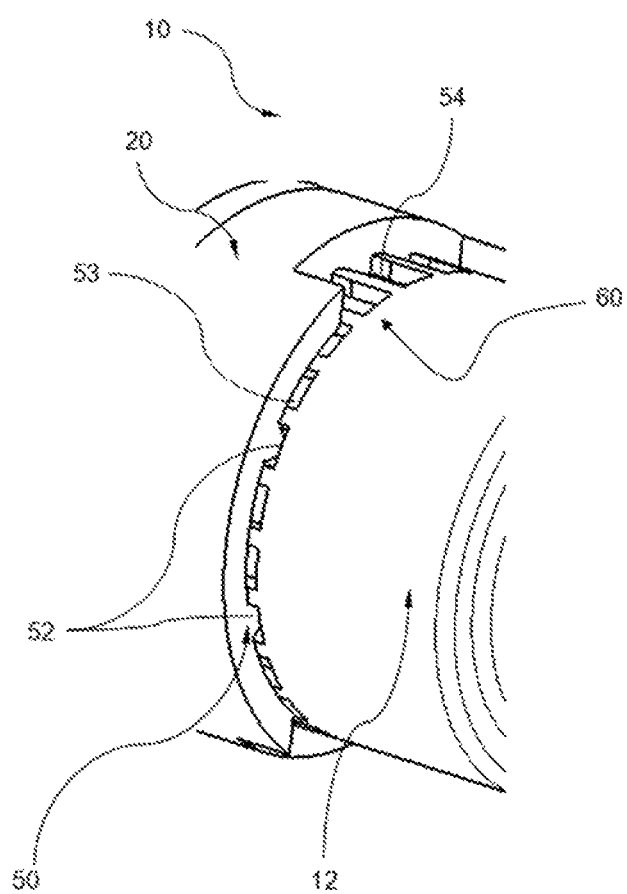

[Fig. 9A]
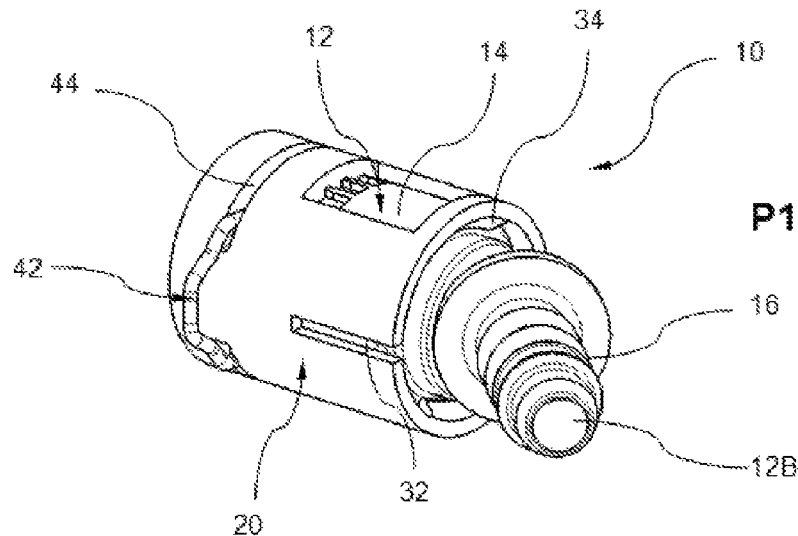
[Fig. 9B]
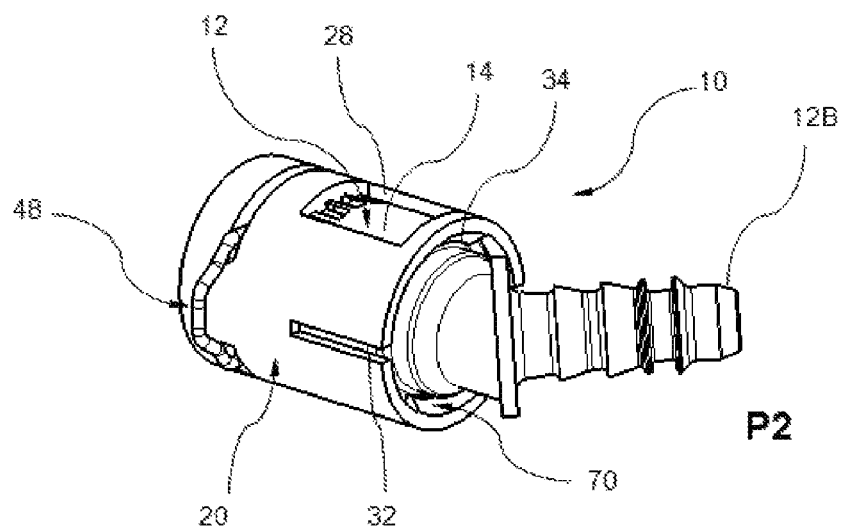

[Fig. 10A]
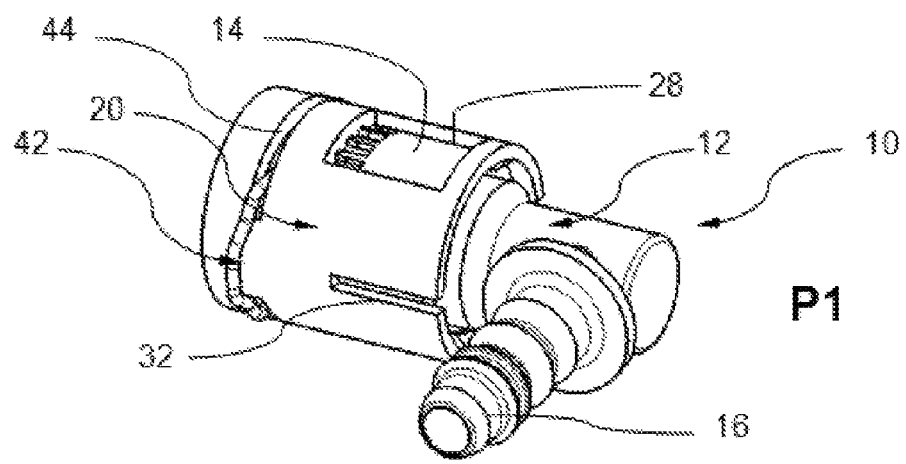
[Fig. 10B]
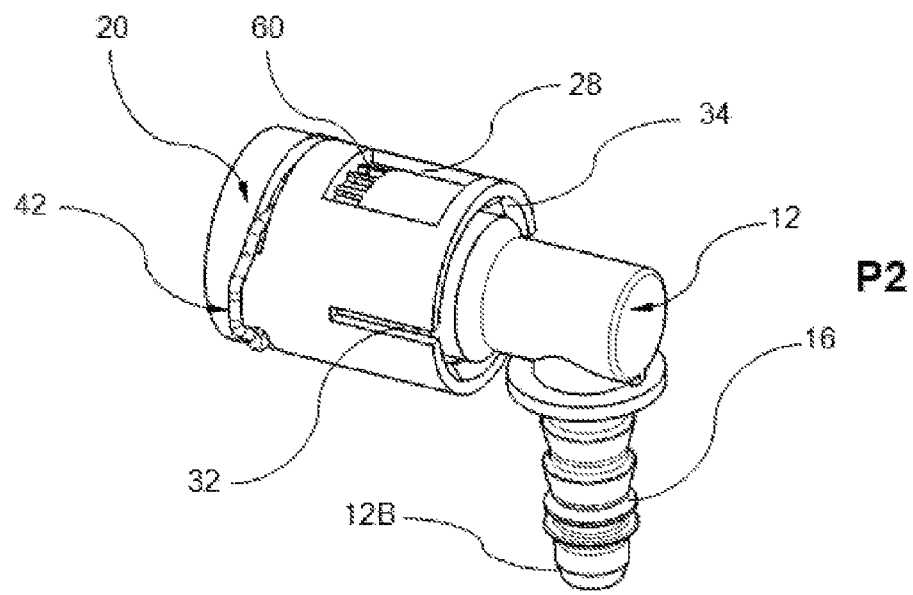

[Fig. 10C]
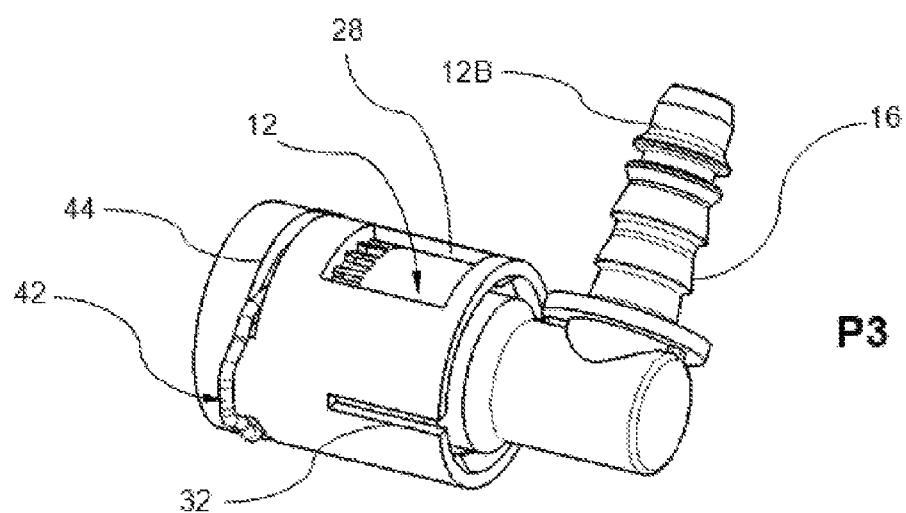

INSTANTANEOUS CONNECTION DEVICE

TECHNICAL FIELD

The present invention concerns a quick-connect device for fluid transfer in a circuit for transporting a fluid such as air or water. It concerns more particularly but not exclusively a quick-connect device for connecting a rigid male fitting to a flexible female hose.

In general, in a fluid transfer circuit for a motor vehicle, it is known, in order to tightly connect a flexible hose to a rigid male fitting, to use a connection device comprising a female socket connector portion and a ring capable of being mounted on the rigid male fitting configured to cooperate with the socket, for example by nesting, snap-fitting or else by welding. The female connector further comprises a tubular fitting specially designed to facilitate fitting of the flexible hose.

Such connection devices generally meet a standard recommended by the German Automotive Industry Association (in German, «Verband der Automobilindustrie») and are commonly referred to in the industry as «VDA connector». Such so-called «VDA» quick connectors are used by most manufacturers of fluid transfer pipes on the automotive and trucks market.

In general, the tubing comprises a peripheral annular groove forming a locking throat and the ring is provided with a locking element such as a metallic spring or metallic clip capable of engaging into the annular throat of the tubing to immobilize the ring relative to the tubing. Moreover, the ring also preferably has in this connector type, one or several indexing or coding mark(s) formed for example by one or several projecting lug(s), generally two in number, disposed diametrically opposite to each other at the periphery of the ring. These lugs are intended to cooperate for example with recessed complementary reliefs formed in the female connector. Possibly, such a device also may include a male tubing with lugs mounted directly on the male tubing without resorting to any additional ring.

The invention applies in particular to the technical field of fluidic connection in the cooling circuits of the engine or of a battery of an electric or hybrid vehicle. The invention may also be used in other similar systems containing a fluid or a gaz.

PRIOR ART

The existing «VDA» quick connectors are generally made of a plastic material and are used to connect hoses made of plastic or flexible hoses made of rubber. They comprise a metallic attachment for locking said connector on the hoses and orientation lugs for stopping the rotation of the male lock-ring connector portion in a predefined orientation.

There is already known from the patent application US 2017/0184240 a connection structure intended to connect a rigid tubing and a flexible hose. In the mounted condition, this structure allows fluidly communicating together the tubing and the hose via a connector. This connection structure comprises a case having a first end portion, in form of a fir-tree corrugated fitting, configured to be connected to the flexible hose and a locking ring, received inside a second end portion of the case.

The ring is provided at one of its ends with a recess configured to receive according to an axial direction a complementary lug projecting from the tubing, thus fixing a predefined relative orientation of the ring and of the tubing. At the other end, the ring is welded inside the case in a relative orientation which is also predefined by a projection/recess complementary pair.

The drawback of this prior art lies in that the relative orientation of the hose and of the tubing is predefined at the time of manufacture. This is not a drawback when the fir-tree corrugated fitting extends axially in the continuation of the tubing since in this instance, the case provided with its fir-tree corrugated fitting has a symmetry of revolution. In contrast, when the fitting forms a deflection angle with respect to the main axis as is the case in this prior art, the relative orientation of the tubing with the fir-tree corrugated fitting is predetermined without necessarily allowing for the consideration of the constraints of the circuit in which they are intended to be installed.

Thus, it turns out to be necessary to provide for several shapes of the case in order to offer several relative orientations of the tubing and of the flexible hose. This requires providing for several different molds. The invention aims in particular at overcoming this drawback.

SUMMARY OF THE INVENTION

To this end, an object of the invention is a quick-connect device for fluid transfer, of the type comprising:
a female socket connector configured to receive a male tubular fitting,
a lock-ring connector configured to cooperate with the female connector and the male tubular fitting in order to relatively immobilize axially and in rotation the male tubular fitting and the female socket connector, the ring connector and the female connector respectively comprise first and second complementary relative positioning members configured to define a plurality of predefined discrete positions of assembly of the two ring and socket connectors, distributed angularly around the main axis characterized in that the ring connector and the female connector comprise mutual assembly means configured to immobilize the two connectors in rotation relative to one another in any selected one of the discrete angular positions and in that the mutual assembly means comprise an elastically expandable distal end portion of the ring connector adapted to be fitted around the female connector by elastic expansion and to grip on an outer annular shoulder formed by a section narrowing of the female connector.

Thanks to the invention, it is possible to select a relative position of the two fluidic transport elements at the time of assembly, and no longer, as is the case in the prior art, at the time of molding or manufacturing the parts.

Furthermore, it is possible to firstly select the relative position of the ring connector and of the female connector and then assemble by immobilizing the two connectors in the selected relative position thanks to the elastic expansion means of the ring connector which is brought to grip on the outer annular shoulder of the female connector. The elastic return of the ring while gripping on the outer shoulder allows immobilizing the two connectors in the selected position.

A quick connection according to the invention may further include one or more of the following features.

In a preferred embodiment of the invention, the female socket connector comprises a main body with an annular general shape around a main axis forming the socket and a fitting extending the socket, for connection to a fluidic conduit element, the outer shoulder extending between the socket and the connection fitting.

In a preferred embodiment of the invention, the female connector comprises a main body in form of socket axially delimited on the one hand by a free end carrying the second positioning member and on the other hand by the outer shoulder, formed at a distance from its free end which forms one of the mutual assembly means.

In a particular embodiment of the invention, the first and second positioning members cooperate by wedging into each of the discrete positions, the assembly configuration of the two ring and socket connectors being capable of preventing any inadvertent disengagement of the two positioning members.

In a preferred embodiment, the circumferential relief is borne at the border of a free end of the female connector.

In a particular embodiment of the invention, the first and second positioning members together define a plurality of distinct lug/groove pairs to define the plurality of discrete positions in each of which at least one lug is adapted to be engaged with a groove.

In a particular embodiment of the invention, one amongst the first and second positioning members comprises at least one positioning lug and the other amongst the first and second positioning members comprises a circumferential relief delimiting a plurality of positioning grooves.

In a particular embodiment of the invention, the first positioning member extends over an inner surface of the ring connector and the second positioning member extends over an outer surface of the socket connector, these two surfaces being intended to face each other, such that the first positioning member cooperates with the second positioning member by radial wedging.

In a particular embodiment of the invention, the angular distribution is regular.

In a particular embodiment of the invention, the discrete positions are distributed around the axis X with an angular step comprised between 5° and 90°, preferably comprised between 10° and 20°.

In a particular embodiment of the invention, the assembly means are of the clipping type.

In a particular embodiment of the invention, the ring connector comprises an elastically expandable distal end portion adapted to be fitted around the socket connector by elastic expansion and to grip on an outer shoulder formed on the socket connector.

In a particular embodiment of the invention, the ring connector comprises a slit skirt provided with at least one snap-fitting bead oriented towards the inside of the skirt forming one of the mutual assembly means.

In a particular embodiment of the invention, the socket connector comprises an outer shoulder formed at a distance from its free end and forming one of the mutual assembly means.

In a particular embodiment of the invention, the male tubular fitting being of the type with an annular throat, the device comprises a locking element arranged to clasp the male tubular fitting in the annular throat throughout the ring connector.

In a particular embodiment of the invention, the ring connector comprises a proximal end portion provided with symmetrical apertures and the locking element has two elastic locking branches grouped together by a gripping head and adapted to be pushed transversely and reversibly through the two symmetrical apertures.

In a particular embodiment of the invention, the female connector comprises a main body with a main axis X forming the socket extended by a fitting with an extension axis X1 which together form an angle comprised between 5° and 90°.

In a particular embodiment of the invention, the ring connector has on its inner surface at least one recess wedged radially towards the outside capable of cooperating with at least one indexing mark formed at the external periphery of the male tubular fitting to enable the rotational immobilization of the ring connector and of the male tubular fitting.

In a particular embodiment of the invention, the device comprises at least five discrete positions, preferably at least ten discrete positions.

In a particular embodiment of the invention, the female connector comprises on its inner surface an inner section narrowing forming a shoulder configured to delimit, together with the ring connector, the male tubular fitting and the inner surface a housing for receiving an O-ring gasket.

BRIEF DESCRIPTION OF THE DRAWINGS

Other features and advantages of the invention will appear in light of the following description, made with reference to the appended drawings in which:

FIG. 1 represents a perspective view of a quick-connect device according to the invention;

FIG. 2 represents an exploded perspective view of the device of FIG. 1;

FIG. 3 represents a partially cutaway perspective view of the device of FIG. 1;

FIG. 4 represents a perspective view of the device of FIG. 1 according to another viewpoint;

FIG. 5 represents an axial sectional view of the device of FIG. 1;

FIG. 6 represents a perspective view of a male tubing intended to be assembled to the device of FIGS. 1 to 5;

FIG. 7 represents an axial sectional view of the device of FIG. 1 assembled with the male tubing;

FIG. 8 represents an enlarged partial view of the first and second positioning members of a male connector and of a female connector of the device of FIG. 1;

FIGS. 9A and 9B illustrate different assembly configurations of the connection device of FIG. 1;

FIGS. 10A-10C illustrate different assembly configurations of the device according to a variant of the invention.

DESCRIPTION OF THE EMBODIMENTS

There is represented in FIGS. 1 to 10 a quick-connect device for the assembly of two elements of fluidic transfer conduits according to the invention. This device is referenced by the general reference numeral 10.

In particular, such a connection device 10 may belong to a circuit for transporting a fluid, such as a cooling fluid of an engine or of a battery of a motor vehicle. For example, it is intended for the quick assembly of a first fluidic tubular element 100 such as a tubing with an annular throat or collar represented in detail in FIG. 6 to a second fluidic conduit element such as a flexible hose (not represented in the figures) intended to be connected for example by fitting onto the connection device 10. For example, the flexible hose is made of an elastomer material, such as rubber.

In accordance with the invention, the device 10 comprises a female socket connector 12 configured at one end 12A to receive a first male fluidic conduit element 100 such as that illustrated for example in FIGS. 6 and 7. This female connector 12 comprises a main body 14 with a tubular general shape around a main axis X forming the socket 14. Preferably, at another end 12B, the female connector 12 is provided with a fitting 16 for connection to a second fluidic conduit element such as a flexible hose (not represented in the figures). In the described example, the fitting 16 is formed by a tubular portion extending the main body 14 of the female connector 12.

In the example illustrated in FIG. 1, the fitting 16 comprises an outer surface shaped for fitting of a flexible hose (not represented) and comprises, on its outer surface, means for axial retention of the flexible hose. For example, the fitting 16 has a staggered relief of the type with fir-tree corrugations intended to receive a flexible hose by fitting (not represented).

Furthermore, as shown in the figures, in particular in FIG. 5, the tubular extension 16 extends according to an axis X1 by forming a deflection angle with the axis X of the main body 14. In this example illustrated in FIGS. 1 to 9, the deflection angle is about 45°. In a variant illustrated in FIGS. 10A-10C, the deflection angle may be 90° so as to form a right-angle elbow or take any other value without departing from the scope of the invention. Possibly, the angle may then be zero.

In the described example, the main body 14 of the female connector 12 internally delimits a housing 18 configured to receive the end 100A of the tubing 100. This housing 18 communicates with an internal axial passage of the tubular fitting 16. In the example illustrated in FIG. 7, the female connector 12 comprises at its first end 12A, on an inner surface of the housing 18 an inner section narrowing forming a shoulder 22 delimiting a room for receiving an O-ring gasket 24.

Preferably, the tubular portion 16 follows an extension axis X1 and the axis X1 forms a deflection angle with the main axis X, for example comprised between 5° and 90°. In FIGS. 1 to 9, the deflection angle is 45°.

In accordance with the invention, the device 10 further comprises a lock-ring connector 20, referred to hereinafter as «ring» or «ring connector». The ring 20 is configured to cooperate with the female connector 12 in order to relatively immobilize axially and in rotation the tubing 100 and the female connector 12.

In the example illustrated in the figures, the ring 20 has an annular sleeve general shape. According to the invention, the ring 20 is configured to cooperate with the female connector 12 in order to relatively immobilize axially and in rotation the first element 100 with the female connector 12.

In the described example, the ring 20 comprises a proximal end portion 20A located for example at the side of the tubing 100 and a distal end portion 20B located for example at the side of the connection to the female connector 12.

In accordance with the invention, the ring connector 20 and the female connector 12 comprise mutual assembly means 70 of the two connectors 20 and 12 relative to one another. Preferably, the mutual assembly means 70 are of the type engageable and releasable. For example, the means 70 are of the clipping or snap-fitting type.

To this end, preferably, the ring 20 comprises, in its distal portion 20B, a radially expandable portion, forming in this example one of the mutual assembly means 70. This portion comprises a slit tubular skirt 30 at its distal end 20B by at least one axial slot 32 so that the tubular skirt 30 is elastically expandable. In the described example, the tubular skirt 30 is divided into two portions 30A, 30B by two axial slots 32. In the described example, the elastically expandable distal end portion 20B is adapted to be fitted around the female connector 12 by elastic expansion and to grip on an outer shoulder 26 formed on the female connector 12. In this example, the outer shoulder 26 forms the other one of the mutual assembly means 70. Preferably, the outer shoulder 26 extends as illustrated in FIG. 3 between the socket-shaped main body 14 and the tubular fitting, by forming an annular section narrowing of the female connector 12.

Furthermore, in the described example, the skirt 30 is provided with at least one inner overthickness 34 forming a snap-fitting bead 34 oriented towards the inside of the skirt 30. The interior of the skirt 30 delimits a volume complementary to the outer volume of the end portion 12A of the female connector 12, in particular two inner overthicknesses 34A, 34B, each overthickness being intended to conform to the section narrowing forming the outer shoulder 26 of the female connector 12. In this example, the distal portion 20B and the outer shoulder 26 form the mutual assembly means 70.

Furthermore, in the described example, the ring 20 comprises two opening 28 formed setback with respect to the end edge 20B of the ring 20. For example, these openings 28 are intended to facilitate the demolding of the ring 20. For example, the ring 20 is formed by injection molding by means of a molding die (not represented). For example, this molding die has a fixed mold, a movable mold and a sliding core for forming the hollow portion. During the removal of the sliding core, in the absence of the openings 28, the overthicknesses 34A and 34B prevent the extraction of the core. Thanks to the openings 28, the extraction of the core is facilitated.

Moreover, preferably, as illustrated in FIG. 2, the ring 20 has an internal shoulder 36 having a radial face 38 turned towards its distal end 20B. In this example, this internal shoulder 36 is located at about mid-length of the ring 20.

Thus, during the assembly of the ring 20 and the female connector 12, this internal shoulder 36 bears against an end edge 40 of the female connector 12. The radial face 38 of this inner shoulder 36 ensures, in cooperation with an end edge 40 of the female connector 12, hooking of the ring 20 on the female connector 12 and its axial immobilization on the latter.

In its proximal portion 20A, the ring 20 is configured to receive a locking element 42 such as a metallic clamp 42 arranged to clasp the first fluidic element 100 throughout the ring 20. To this end, preferably, the proximal portion 20A is provided on its outer surface with circumferential slots 44 opposite to each other or symmetrical apertures 44.

For example, the clamp 42 has U-like general shape and has two branches 46 substantially parallel to each other, capable of crossing the proximal end portion 20B of the ring 20, from the outside, to fit into the circumferential slots 44 of the ring 20.

In this example, the locking element 42 is composed by an elastically deformable metallic wire element and comprises a pair of parallel branches portions 46 and a connecting portion 48 linking the upper ends of the branches 46 to each other. In this example, the locking element 42 is configured to be retained by the ring 20, the plane defined by the branches 46 and the linking portion 48 extending perpendicularly to the axis X and the two branches 46 being crossed and retained by the circumferential slots 44 of the ring 20 respectively.

Consequently, the two ends of each branch 46 are retained by the two end portions of the corresponding retaining slots 44, respectively, and the intermediate portion of each branch 46 extends inside the bore of the ring 20. In the illustrated example, each branch 46 comprises a curved end 47, the two ends 47 being curved relatively in opposite direction. The free end 47 of each branch 46 of the clamp 42 is wound on the external diameter of the ring 20. Thus, in this example, the clamp 42 is retained in the same manner as a slit pin.

In accordance with the invention, the ring 20 and the female connector 12 respectively comprise first 50 and second 60 complementary positioning members configured to define a plurality of predefined discrete positions of assembly of the two connectors 20 and 12. These predefined discrete positions are distributed angularly around the main axis X, such that in any one of these angular positions, the two connectors 12 and 20 are immobilized in rotation relative to one another.

More particularly, the mutual assembly means 70 are configured to immobilize the two connectors 20 and 12 in rotation relative to one another in any selected one of the discrete angular positions.

Thus, preferably, the first 50 and second 60 positioning members cooperate by wedging into each of the discrete positions, the mutual assembly configuration of the two connectors 12 and 20 being capable of preventing any inadvertent disengagement of the two positioning members 50 and 60.

In the described example, the female connector 12 comprises a main body in the form of a socket 14 axially delimited on the one hand by a free end carrying the second positioning member 60 and on the other hand by the outer shoulder 26, formed at a distance from its free end which forms one of the mutual assembly means 70.

Preferably, the first 50 and second 60 positioning member together define a plurality of distinct lug 52/groove 54 pairs to define the plurality of discrete positions in each of them at least one lug 52 is adapted to engage with a groove 54.

Preferably, one amongst the first 50 and second 60 positioning members comprises at least one positioning lug 52 and the other amongst the first 50 and second 60 positioning members comprises a circumferential relief 53 delimiting a plurality of positioning grooves 54.

In the example illustrated in detail in FIG. 8, the first positioning member 50 extends over an inner surface of the ring 20 and the second positioning member 60 extends over an outer surface of the female connector 12, these two surfaces being intended to face one another after mutual assembly of the mutual assembly means 70, such that the first positioning member 50 cooperates with the second positioning member 60 by radial wedging inside the selected groove 54. In the example illustrated in FIG. 2, the positioning member 60 is in the form of a crenelated relief at the free end border of the socket 14 of the female connector 12 which will be described in more detail hereinafter.

In the illustrated example, the grooves 54 extend axially according to their longitudinal direction. In the described example, the grooves 54 are borne on an outer annular surface of an end edge of the female connector. These grooves 54 are open in the axial direction in order to enable an axial engagement of the positioning lug 52 borne by the inner surface of the ring 20 inside the groove 54 corresponding to the desired angular position. In the illustrated example, the circumferential relief 53 extends at the border and the positioning lugs 52 are borne by an internal shoulder of the ring 20.

Of course, in a variant which is not illustrated in the figures, the two surfaces may extend radially or transversely and in this case the wedging is axial.

In these figures, the relief 53 is of the crenelated type so as to define a plurality of grooves 54. In the illustrated example, the relief 53 has a profile with rectangular crenellations. Of course, other shapes may be suitable, such as a wave profile, of the type with spiky teeth, etc. Moreover, as regards the lug(s) 52, any shape may be suitable such as needle-, pin-, wedge-like shapes, etc. Furthermore, the arrangement of the relief 53 may be organized, in a non-illustrated variant, according to a rosette-like pattern.

Moreover, it goes without saying that the relief 53 may be borne by the ring connector 20 and the lug 52 or the lugs 52 by the female connector 12 yet without departing from the scope of the invention.

Furthermore, although in the figures, the female connector 12 and the ring 20 have annular surfaces, it is possible to also consider slightly cambered surfaces or with a conical general shape.

Preferably, the angular distribution of the discrete positions is regular. For example, the discrete positions are distributed around the axis X with a 10° step and preferably more generally comprised between 5° and 45°, or else comprised between 5° and 40°. The number of discrete positions depends on the angular value of the step. Of course, the angular distribution may be irregular.

Preferably, the first 50 and second 60 relative positioning complementary members are configured to defined at least five predefined discrete positions of assembly of the two ring 20 and socket 12 connectors and preferably more than 10 positions.

Furthermore, the ring 20 has on its inner surface at least one recess 112 or 122 wedged radially outwards capable of cooperating with at least one indexing 110 or coding 120 mark formed at the external periphery of the first tubular element 100 to enable the rotational immobilization of the ring 20 and of the tubular first element 100.

The indexing mark 110 serves to define and lock the relative angular position of the connector 20 and of the male tubing 100 while the coding mark 120 is intended to prevent the improper connection between two distinct male tubings, in particular with identical dimension. Indeed, if two different circuits have the same diameter, it may be necessary to avoid a connection error. In this case, the coding lug 120 of the male tubing 100 cannot fit into the female connector 12 which has the corresponding recessed counter-form 122, thus avoiding any risk of connection error. The indexing 110 and coding 120 lug and the associated counter-forms 112 and 122 have different dimensions which prevent the reversal of the indexing and of the coding. Alternatively, the ring connector 20 may integrate none of these lugs or may integrate the indexing and/or the coding. Furthermore, preferably, the male tubing 100 comprises an annular throat 130.

The main aspects of operation of the device 10 according to the invention will now be described with reference to FIGS. 9A and 9B. In this variant, the tubular fitting 16 and the male tubing 100 are intended to form a 45° angle.

Initially, the connection device 10 is composed by a plurality of distinct components, as illustrated in FIG. 2.

During a first step, the locking element 42 is inserted transversely throughout the retaining circumferential slots 44. For this purpose, the clamp 42 is slightly inclined in order to enable the insertion of the feet 47 into the circumferential slots 44.

Afterwards, during a second step, the O-ring gasket 24 is positioned inside the housing 18 of the female connector 12 against the shoulder 22.

Then, during a third step, a discrete position is selected from the plurality of possible positions. This discrete position is selected by taking into account the desired relative orientation between the two elements of fluidic conduits. For example, FIGS. 9A and 9B illustrate two positions P1 and P2.

The coding receiving recess serves as a visual reference point for the orientation of the ring connector 20 while the fitting 16 of the female connector 12 fixes the orientation of the female connector 12.

Afterwards, the ring 20 is inserted around the female connector 12, in this example by snap-fitting. During this forced assembly carried out by elastic deformation, the lug(s) 52 of the first positioning member 50 are accommodated inside a corresponding groove 54 of the second positioning member 60. This enables the rotational immobilization of the female connector 12 and of the ring connector 20 relative to one another thanks to the mutual assembly means 70 (FIGS. 3 and 4) which are brought to block the lug 52 by elastic deformation in the selected groove 54. Furthermore, once this assembly is completed, the male tubing 100 is inserted inside the device 10. Thus, the clamp 42 is accommodated inside the annular throat 130 of the male tubing 100. The element 42 is arranged to clasp the male tubular fitting 100 in the annular throat 130 throughout the ring connector 20 (FIG. 5).

Thus, thanks to the invention, it is possible to select a relative orientation of the male tubing 100 and of the connector fitting 16 during the mounting of the connection device 10 and not, at the time of manufacture. In FIGS. 10A-10C, three discrete positions P1, P2 and P3 have been represented. Of course, the invention is not limited to the previously described embodiments. Other embodiments within the reach of those skilled in the art may also be considered yet without departing from the scope of the invention defined by the claims hereinafter.

The invention claimed is:

1. A quick-connect device for fluid transfer, comprising:
a female socket connector configured to receive a male tubular fitting,
a lock-ring connector configured to cooperate with the female socket connector and the male tubular fitting in order to relatively immobilize axially and in rotation the male tubular fitting and the female socket connector, the lock-ring connector and the female socket connector respectively comprise first and second complementary relative positioning members configured to define a plurality of predefined discrete angular positions of assembly of the lock-ring connector and the female socket connector, distributed angularly around a main axis wherein the lock-ring connector and the female socket connector comprise mutual assembly means configured to immobilize the lock-ring connector and the female socket connector in rotation relative to one another in any selected one of the discrete angular positions and in that the mutual assembly means comprise an elastically expandable distal end portion of the lock-ring connector adapted to be fitted around the female socket connector by elastic expansion and to grip on an outer annular shoulder formed by a section narrowing of the female socket connector, and wherein the male tubular fitting comprises an annular throat, and the device comprises a locking element arranged to clasp the male tubular fitting in the annular throat throughout the lock-ring connector.

2. The device according to claim 1, wherein the female socket connector comprises a main body with an annular general shape around the main axis forming a socket and a connection fitting extending the socket, for connection to a fluidic conduit element, the outer annular shoulder extending between the socket and the connection fitting.

3. The device according to claim 1, wherein the female socket connector comprises a main body in form of socket axially delimited on one side by a free end carrying the second complementary relative positioning member and on another side by the outer annular shoulder, formed at a distance from the free end which forms one of the mutual assembly means.

4. The device according to claim 1, wherein one amongst the first and second complementary relative positioning members comprises at least one positioning lug and the other amongst the first and second complementary relative positioning members comprises a circumferential relief delimiting a plurality of positioning grooves.

5. The device according to claim 4, wherein the circumferential relief is borne at the border of a free end of the female socket connector.

6. The device according to claim 1, wherein the first complementary relative positioning member extends over an inner surface of the lock-ring connector and the second complementary relative positioning member extends over an outer surface of the female socket connector, these two surfaces being intended to face each other, such that the first complementary relative positioning member cooperates with the second complementary relative positioning member by radial wedging.

7. The device according to claim 1, wherein the discrete angular positions are distributed around the main axis with an angular step comprised between 5° and 90°.

8. The device according to claim 1, comprising at least five discrete angular positions.

9. The device according to claim 1, wherein the mutual assembly means are engageable and releasable.

10. The device according to claim 1, wherein the lock-ring connector comprises a slit skirt provided with at least one snap-fitting bead oriented towards the inside of the skirt forming one of the mutual assembly means.

11. The device according to claim 1, wherein the lock-ring connector comprises a proximal end portion provided with two symmetrical apertures and the locking element has two elastic locking branches grouped together by a gripping head and adapted to be pushed transversely and reversibly through the two symmetrical apertures.

12. The device according to claim 1, wherein the female socket connector comprises a main body with the main axis forming a socket extended by a fitting with an extension axis which together form an angle comprised between 5° and 90°.

13. The device according to claim 1, wherein the lock-ring connector has on an inner surface at least one recess wedged radially towards the outside capable of cooperating with at least one indexing or coding mark formed at an external periphery of the male tubular fitting to enable the rotational immobilization of the lock-ring connector and of the male tubular fitting.

14. The device according to claim 1, wherein the female socket connector comprises on an inner surface an inner section narrowing forming a shoulder configured to delimit, together with the lock-ring connector, the male tubular fitting and the inner surface a housing for receiving an O-ring gasket.

* * * * *